United States Patent [19]

Hill et al.

[11] 4,105,176
[45] Aug. 8, 1978

[54] KNOCKDOWN STAND FOR ELECTRONIC INSTRUMENT

[75] Inventors: James A. Hill, Aloha; David R. Hargis, Hillsboro, both of Oreg.

[73] Assignee: Tektronix, Inc., Beaverton, Oreg.

[21] Appl. No.: 768,442

[22] Filed: Feb. 14, 1977

[51] Int. Cl.² .................................................. F16F 15/00
[52] U.S. Cl. .................................... 248/13; 248/165; 248/461
[58] Field of Search ............... 248/13, 460–465, 248/150, 165, 176, 177, 187, 159; 297/17; 108/34, 38

[56] References Cited

U.S. PATENT DOCUMENTS

| 1,069,617 | 8/1913 | Ilvonen | 248/461 |
| 1,320,322 | 10/1919 | De Long | 248/461 |
| 2,156,489 | 5/1939 | Bonetti | 248/461 |
| 2,873,552 | 2/1959 | Jewell | 248/460 |
| 3,596,866 | 8/1971 | Baker | 248/461 |
| 3,934,806 | 1/1976 | Rady | 248/460 |

FOREIGN PATENT DOCUMENTS 557,032  8/1932  Fed. Rep. of Germany ............ 248/13

*Primary Examiner*—Lawrence J. Staab
*Attorney, Agent, or Firm*—John D. Winkelman

[57] ABSTRACT

A lightweight stand that attaches to the bottom of a portable electronic instrument, such as an oscilloscope. Used in one assembled form to support the instrument at a convenient, working height and attitude, the stand can be dismantled easily and reassembled in compact, self-contained form for transit or storage.

10 Claims, 5 Drawing Figures

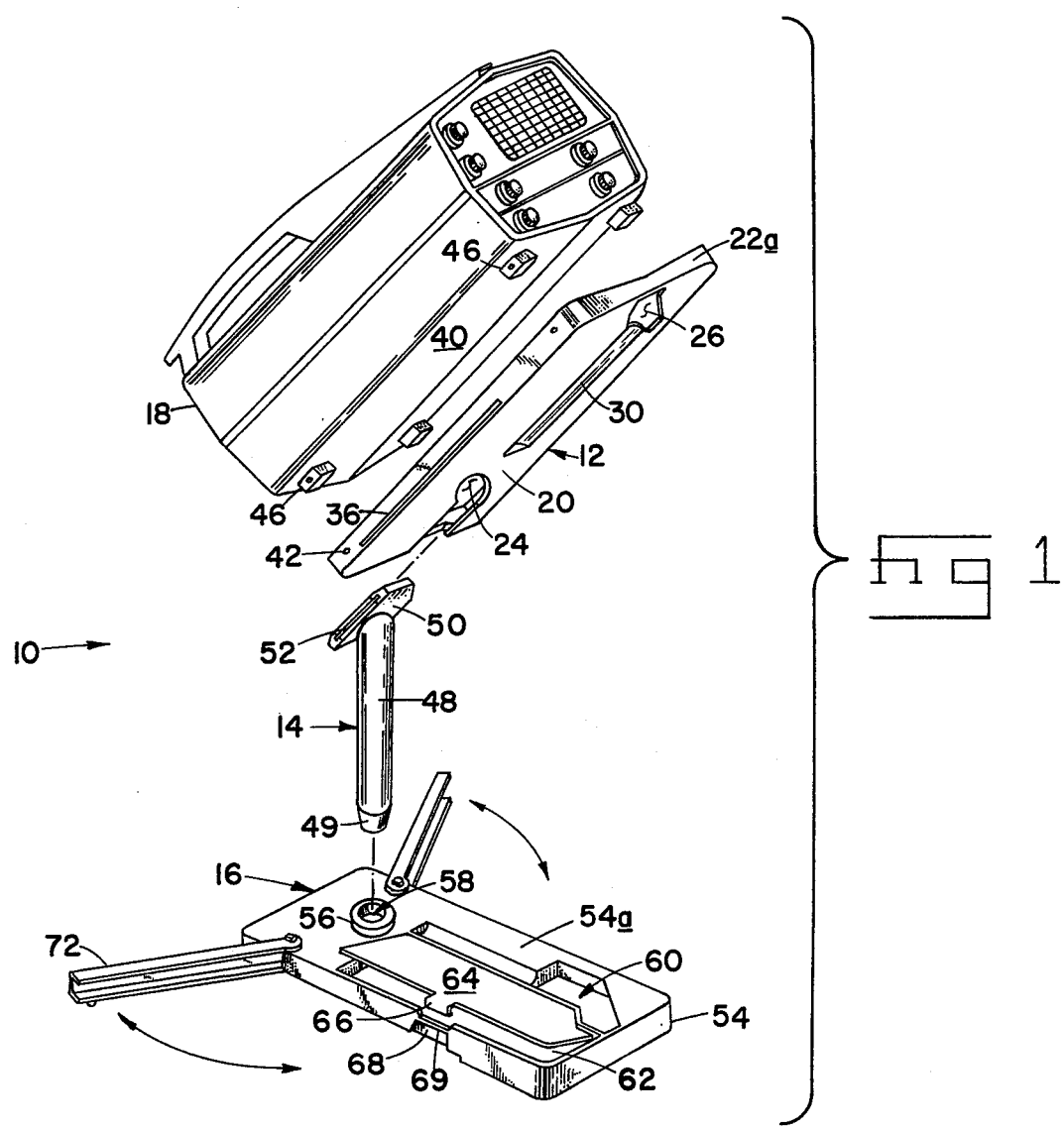
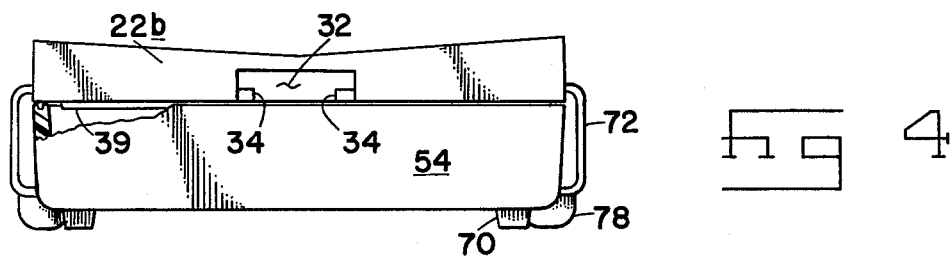
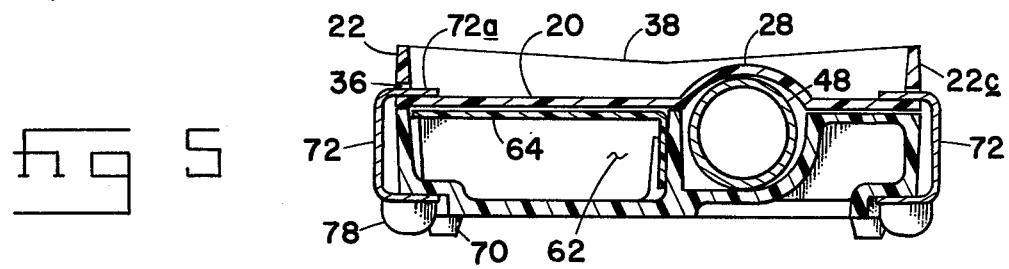

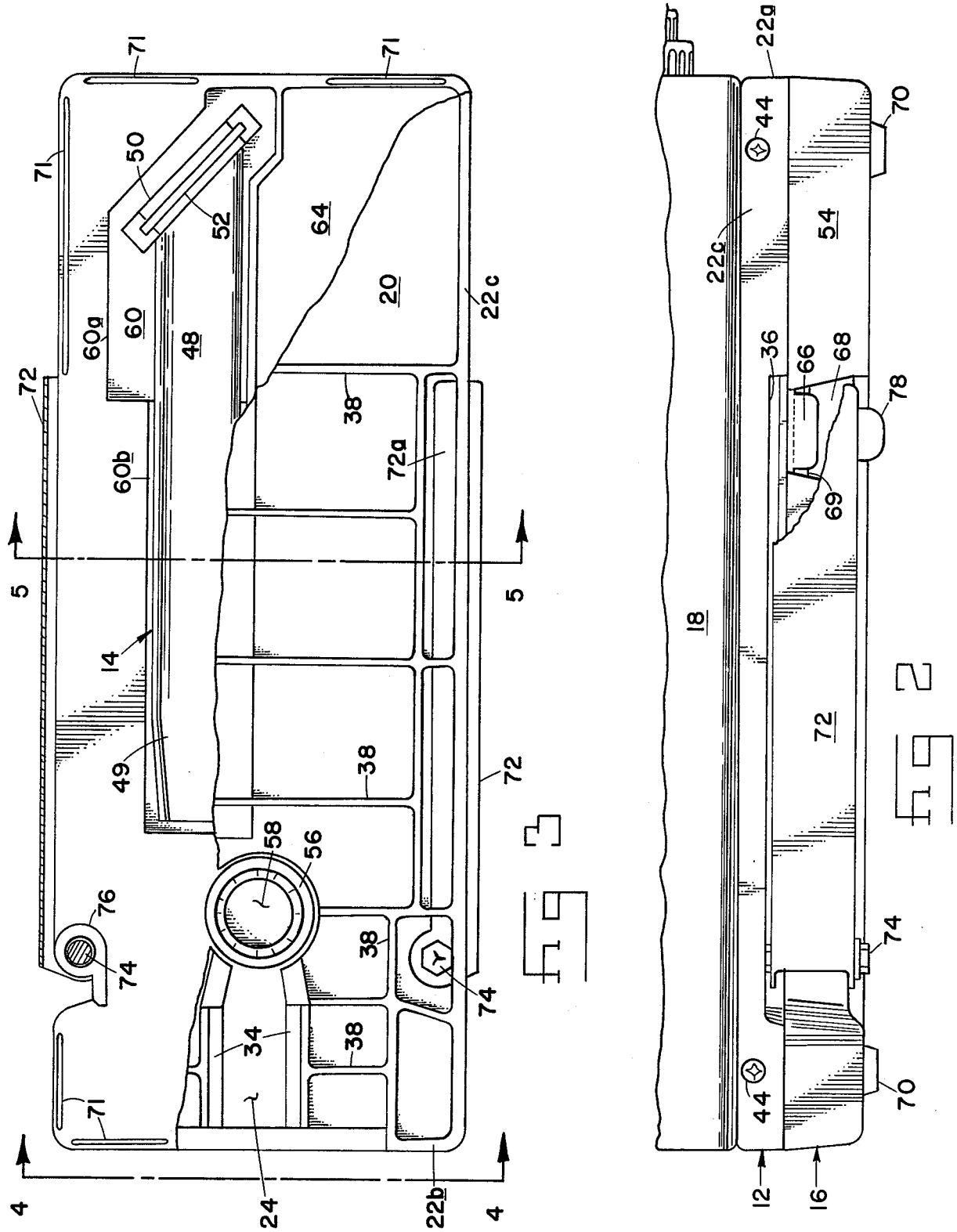

KNOCKDOWN STAND FOR ELECTRONIC INSTRUMENT

BACKGROUND AND OBJECTS OF THE INVENTION

The present invention relates generally to support stands, and more particularly to a knockdown stand for an electronic instrument, such as an oscilloscope.

Most oscilloscopes and other test and measurement instruments, including portable versions of such instruments, are designed primarily for benchtop use. In many situations, computer servicing for example, a suitable elevated support surface may not be conveniently available at a work site. To meet the need for a readily movable instrument support that can be stationed where needed, various types of carts and stands have been provided. For example, U.S. Design Pat. No. 192,792 to Morris shows a well-known mobile stand design that includes an angularly adjustable tray supported above a platform base by a pair of inverted-V-shaped frame members. Wheels are provided at each corner of the base for ease in moving the stand from place to place.

Another well-known type of cart is shown in U.S. Design Pat. No. 210,360 to Gerakos. Intended for use with portable oscilloscopes and other instruments having a similar configuration, the cart has an angularly adjustable tray mounted in a yoke attached to the upper end of a support column. The lower end of the column is secured to a platform base, one end of which is provided with wheels for ready mobility.

U.S. Pat. No. 2,992,833 to Hoedinghaus et al. relates to a collapsible cart for oscilloscopes and other electronic instruments. The cart is formed from a pair of inverted-U-shaped frame members, the legs of which are pivotally interconnected to form a collapsible X-shaped structure. A first tray is pivotally mounted between the upper portions of the frame members, and is adapted to be supported in either a horizontal position or at a 22° angle. A second, lower tray is removably supported between the lower portions of the U-shaped members, each of which is provided with a pair of casters at its lower ends.

While such prior art instrument support apparatus is quite useful, it is also comparatively bulky and does not lend itself to use in applications where portability is a primary consideration. Clearly, a need exists for a compact, lightweight support stand for portable electronic instruments, and an object of the present invention is to satisfy this need in a practical and satisfactory manner.

A more specific object of the invention is to provide a knockdown stand that can be assembled in different ways, one for supporting a portable electronic instrument at a convenient height and attitude above a surface, and another for compact storage and transport.

Another object of the invention is to provide a lightweight, knockdown stand that can be attached to a portable electronic instrument and carried by the instrument in a compact, self-contained form.

Still another object of the invention is to provide a knockdown stand having means accommodating the storage of instrument accessories.

A further object of the invention is to provide a stand that can support a portable electronic instrument at a convenient height and attitude in a safe, stable manner, but which can be disassembled readily and reassembled in a more compact form for transport or storage.

Additional objects, features and advantages of the present invention will become apparent as the following description of a preferred embodiment thereof is read in conjunction with the accompanying drawings.

BRIEF DESCRIPTION OF THE DRAWINGS

FIG. 1 is an exploded, perspective view of an oscilloscope and an associated knockdown stand for supporting the oscilloscope at a convenient height and attitude above a surface.

FIG. 2 is a fragmentary side view of the oscilloscope and stand of FIG. 1, the stand having been disassembled and reassembled in a compact self-contained form;

FIG. 3 is a top plan view of the FIG. 2 stand alone, with portions broken away to show details of construction;

FIG. 4 is a rear view of the FIG. 3 stand; and

FIG. 5 is a transverse sectional view taken along line 5—5 in FIG. 3.

DETAILED DESCRIPTION OF PREFERRED EMBODIMENT

Referring now to the drawings, a knockdown stand for an electronic instrument, herein a cathode ray oscilloscope, is indicated generally at 10 in FIG. 1. Stand 10 includes three main components: a platform 12, a post 14, and a base assembly 16. The platform, post and base assembly can be put together in two different functional arrangements, or forms, one (shown in FIG. 1) for supporting a portable oscilloscope 18 at a certain height and attitude above a surface on which the base is resting, and another (shown in FIGS. 2-5) for compact storage or transport.

Platform 12 is a one piece elongate rectangular tray-like member having a floor 20 joined to a continuous, upstanding rim 22 that includes front and rear end sections 22a, 22b respectively, and opposed side sections 22c. As best shown in FIG. 1, floor 20 has a keyhole-shaped central rear opening 24 and an irregular forward opening 26. A curved ridge 28 (FIG. 5) in floor 20 extends rearward from opening 26, forming a downward opening channel 30 in platform 12. Rear end section 22b of rim 22 is provided with a rectangular opening 32 (FIG. 4) communicating with keyhole-shaped opening 24 and exposing opposed edge portions 34 of floor 20 adjoining opening 24. Each of the rim's side sections 22c includes an elongate slot 36 extending along the base of the rim, as shown in FIG. 1. A network of logitudinally- and transversely-extending ribs 38 (FIGS. 3 and 5) joined to floor 20 and rim 22, and to each other, are provided in platform 12 to strengthen and stiffen it. On the underside of the platform, narrow ribs 39 (FIG. 4) depend from the front, rear and side sections of rim 22, as shown.

It will be understood that platform 12 is designed to be attached to the bottom of oscilloscope 18, which, as shown in FIG. 1, has a shallow V-shaped lower surface 40. To provide a close fit between the instrument and platform 12, the upper surface of the platform preferrably is configured to complement surface 40. Thus, as shown in FIGS. 1, 4 and 5, the upper margins of rim end sections 22a, 22b and of ribs 38 have a shallow V contour that is complementary to the bottom surface contour of oscilloscope 18. Small holes 42 (FIG. 1) provided adjacent each corner of platform 12 in side rim sections 22c accommodate screws 44 (FIG. 2), which engage mounting feet 46 on oscilloscope 18 to secure the instrument to the platform.

Post 14 comprises a tubular metal shaft 48 having a tapered lower end portion 49. Secured to the upper end of the shaft at a suitable angle, herein about 45°, is an oblong plate 50 having a groove 52 in each of its longer sides, i.e., its left and right sides in FIG. 1. The front portion of the plate is tapered moderately (about 10°) in width as shown in that figure.

Base assembly 16 includes an elongate rectangular, slab-like base 54 having a plan view outline commensurate with that of platform 12. Set in the upper surface 54a of the base within an annular boss 56 is a conical socket 58, the taper of which matches that of shaft portion 49. An irregular cavity 60 opening into surface 54a is formed in the base forward of socket 58. The forward portion 60a (FIG. 3) of the cavity has substantially the same shape as opening 26 in platform 12. The length and width of rear portion 60b are commensurate with those of channel 30. A generally rectangular compartment 62 is formed in the base alongside cavity 60. Compartment 62 is provided with a hinged cover 64 having an integral catch 66 that engages a rib 69 formed within a recess 68 in one side, the left side in FIG. 1, of base 54. When the cover is closed, its top surface is flush with the base's upper surface 54a. Narrow marginal grooves 71 are formed in upper surface 54a along the front, rear and sides of the base, as shown in FIG. 3. A groove is provided in the base for each rib 39 in platform 12. Four mounting feet 70 are provided on the underside of base 54, one adjacent each corner thereof as shown in FIGS. 2, 4 and 5.

Assembly 16 further includes a pair of stabilizing arms 72, each of which is hingedly attached at one end to base 54 by a threaded fastener 74 that extends through a sleeve 76 in the base. A foot 78 is secured to the lower side of each arm adjacent the free end thereof. Arms 72 have a box C cross-sectional configuration, and are oriented with their open sides facing as shown in FIG. 1. Sleeves 76 are located adjacent the opposite sides of base 54, laterally outward and slightly rearward of boss 54 as shown in FIGS. 1-3. The pivotal mounting of arms 72 enables them to be swung between a first position, shown in FIGS. 2-5, in which they extend along the sides of base 54, and a second, stabilizing position, shown in FIG. 1, in which the arms extend outward at a substantial angle, suitably about 120°.

In stand 10, platform 12 and base 54 are molded of a fiber-reinforced plastic, suitably glass filled acrylonitrile-butadiene-styrene (ABS). Post 14 and arms 72 preferably are fabricated of aluminum or other strong, rigid, lightweight metal. Compartment cover 64 is molded of polypropylene.

As mentioned above, stand 10 has two different assembled forms. In one (shown in FIG. 1), the lower end of post 14 is firmly inserted in socket 58, which holds the post in an upright position. Platform 12 is mounted on the upper end of post by inserting plate 50 into openings 24 and 32 in the platform, so that edge portions 34 are received in grooves 52 in the plate. As will be understood, the grooves are dimensioned to provide a snug, secure fit. Finally, arms 72 are swung outward from the base to their stabilizing position. Oscilloscope 18, which is secured to platform 12 by screws 44, is thus held at a convenient height and attitude (45°) relative to a surface, normally the floor, on which the base is resting. Cables, connectors, probes, and like accessories are stored in compartment 62.

For transport, storage, or use on a work bench, stand 10 can be disassembled and reassembled in the more compact form shown in FIGS. 2-5. After platform 12 is removed from post 14 by pulling it free of grooves 52, the post is disengaged from socket 58 and laid in cavity 60. The platform is then placed directly on top of base 54, with ribs 39 on the underside of the platform engaging the corresponding grooves 71 in upper surface 54a of the base, as shown in FIG. 4. Thus nested, the platform and base are clamped together by swinging arms 72 inward. The upper flanges 72a of the arms enter slots 36 in the platform and engage floor 20, holding platform 12 in place overlying the upper surface of base 54. Boss 56 projects through the forward portion of opening 24 in the platform to assist in preventing relative movement between the platform and base.

Reassembled in the manner just described, the stand is extremely compact. Because of its compactness and light weight, the stand of the invention can be carried with an instrument at all times, so that it is always available where and when it is needed. The stand also serves as an accessory carrier for the instrument.

There is thus provided a knockdown instrument stand that amply fulfills the various objectives set forth above. While a preferred embodiment of the invention has been described in detail, it will be appreciated that various modifications and changes may be made without departing from the spirit of the invention. For example, the length and width of the platform and base are chosen to suit the particular instrument with which the stand is to be used. Likewise the mounting location of the post is determined by the center of gravity of the instrument. The length of the post, herein about 11 in., is chosen to provide a convenient instrument support height.

We claim:

1. A knockdown stand for use in one assembled form to support a portable electronic instrument at a certain height and attitude above a surface, which stand can be dismantled and reassembled in another, more compact form for storage or transport, comprising an elongate post, an instrument support platform having upper surface means for receiving an electronic instrument to be supported by the stand, and means for removably receiving, in said one assembled form of the stand, an upper end portion of said post, a base configured to rest on a support surface in a stable manner, said base having means for removably receiving, in said one assembled form of the stand, a lower end portion of said post and holding the post in a generally upright position, complementary configured upper surface means for receiving said platform in nested association in said other assembled form of the stand, and means defining a cavity therein for storage of said post during use of the stand in said other assembled form, and means comprising a pair of stabilizing arms hingedly attached to the base at the opposite sides thereof for releasably locking said platform and base together in said other assembled form when the same are received in nested association, said arms being movable to and from a first, locking position wherein they are disposed adjacent the sides of said base and a second, stabilizing position where they extend outwardly at an angle therefrom and engage said support surface.

2. A knockdown stand that can be assembled in two different forms, including one form for supporting an electronic instrument at a certain height and attitude above a surface, and another, more compact form for transport or storage, comprising an elongate post, an instrument support platform adapted to be mounted on said post, a base having means for releasably holding said post in a generally upright position and further having means for receiving said platform in nested association, the post with said platform mounted thereon being held in a generally upright position by the base in said one form of assembly, the platform being received by the base in nested association in said other form of assembly, means for releasably locking said platform and base together in said other form of association, and means for stabilizing said stand in said one form of assembly, comprising a pair of elongate members attached to said base for pivotal movement toward and away therefrom, said members including support surface engaging means adjacent an end thereof.

3. The stand of claim 2, wherein said base includes means defining a cavity therein for storage of said post when the stand is assembled in its other form.

4. The stand of claim 2, wherein said base includes means defining an accessory storage compartment therein.

5. The stand of claim 2, wherein said platform includes means accommodating the attachment thereto of a portable electronic instrument.

6. The stand of claim 2, wherein said platform is disposed at an angle of about 45° relative to said base in said one form of assembly.

7. A knockdown stand that can be assembled in two different forms, including one form for supporting a portable electronic instrument at a certain height and attitude above a surface, and another, more compact form for transport or storage, comprising an elongate post, an instrument support platform having complementary configured upper surface means for receiving an electronic instrument, and means for removably receiving, in said one assembled form of the stand, an upper end portion of said post, a base configured to rest on a support surface in a stable manner, said base having means removably receiving a lower end portion of said post and holding the post in a generally upright position in said one assembled form of the stand, and further having complementary configured means for receiving said platform in nested association in said other assembled form of the stand, means for releasably locking said platform and base together in said other assembled form, and a pair of stabilizing arms hingedly attached to the base at opposite sides thereof for movement toward and away therefrom, said arms including means for engaging said support surface to stabilize said stand.

8. The stand of claim 7, said base additionally having means defining a cavity therein for storage of said post when the stand is assembled in its other form.

9. The stand of claim 7, wherein movement of said arms toward the base into a position adjacent the sides thereof locks said platform and base together when the same are received in nested association.

10. The stand of claim 7, wherein said platform includes means accommodating the attachment thereto of an electronic instrument.

* * * * *